US009555684B2

(12) United States Patent
Street et al.

(10) Patent No.: US 9,555,684 B2
(45) Date of Patent: Jan. 31, 2017

(54) GAS SPRING ASSEMBLY AND METHOD OF ASSEMBLING SAME

(71) Applicant: Firestone Industrial Products Company, LLC, Indianapolis, IN (US)

(72) Inventors: Stephen C. Street, Carmel, IN (US); James D. Boomer, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/645,415

(22) Filed: Mar. 11, 2015

(65) Prior Publication Data

US 2015/0183287 A1   Jul. 2, 2015

Related U.S. Application Data

(63) Continuation of application No. 13/643,829, filed as application No. PCT/US2010/032349 on Apr. 26, 2010, now Pat. No. 8,979,075.

(51) Int. Cl.
*B60G 11/62* (2006.01)
*B60G 11/27* (2006.01)
(Continued)

(52) U.S. Cl.
CPC .............. *B60G 11/62* (2013.01); *B60G 11/27* (2013.01); *B60G 11/28* (2013.01); *F16F 1/44* (2013.01);
(Continued)

(58) Field of Classification Search
CPC .............. B60G 2202/152; B60G 11/27; B60G 2206/424; B60G 2202/314; F16F 9/3271; F16F 9/052
See application file for complete search history.

(56) References Cited

U.S. PATENT DOCUMENTS 2,861,851 A * 11/1958 Young .................... F04B 53/14
                                                        403/361
4,714,271 A   12/1987 Shouishi et al.
(Continued)

FOREIGN PATENT DOCUMENTS

DE   197 20 776   11/1998
DE   197 33 281   2/1999
(Continued)

OTHER PUBLICATIONS

International Search Report and Written Opinion from corresponding patent application No. PCT/US2010/032349 dated Jul. 21, 2010.
(Continued)

*Primary Examiner* — Vishal Sahni
(74) *Attorney, Agent, or Firm* — Thomas R. Kinsbury; Fay Sharpe LLP

(57) ABSTRACT

A gas spring assembly includes an end member, a piston assembly and a flexible sleeve secured therebetween. An end closure secures an end of the flexible sleeve to the piston assembly. A connector fitting connects the end closure to a support post of the piston assembly. The connector fitting includes a fitting passage and a first annular groove. A jounce bumper assembly is supported on the connector fitting. The jounce bumper assembly includes a bumper body and a bumper mount. The bumper mount includes securement pin having a second annular groove. A retaining member is received within the first and second annular grooves such that the jounce bumper assembly can freely rotate relative to the connector fitting while substantially restricting axial displacement of the jounce bumper assembly relative to the piston assembly during such rotation.

20 Claims, 3 Drawing Sheets

(51) Int. Cl.
*B60G 11/28* (2006.01)
*F16F 1/44* (2006.01)
*F16F 9/05* (2006.01)
*F16F 9/32* (2006.01)
*F16F 13/00* (2006.01)

(52) U.S. Cl.
CPC ............ *F16F 9/052* (2013.01); *F16F 9/3271* (2013.01); *F16F 13/002* (2013.01); *B60G 2202/143* (2013.01); *B60G 2202/152* (2013.01); *B60G 2204/126* (2013.01); *B60G 2204/4502* (2013.01); *B60G 2206/80* (2013.01); *F16F 2226/04* (2013.01); *F16F 2230/0005* (2013.01); *Y10T 29/49609* (2015.01); *Y10T 29/49611* (2015.01)

(56) References Cited

U.S. PATENT DOCUMENTS

| | | | |
|---|---|---|---|
| 5,129,634 A | 7/1992 | Harris | |
| 5,921,532 A | 7/1999 | Pierce et al. | |
| 7,500,659 B2 * | 3/2009 | Levy | B60G 11/28 267/64.21 |
| 8,979,075 B2 * | 3/2015 | Street | B60G 11/27 267/219 |
| 2006/0226586 A1* | 10/2006 | Levy | B60G 11/28 267/64.27 |
| 2008/0211150 A1* | 9/2008 | Levy | B60G 11/28 267/64.27 |
| 2008/0284072 A1 | 11/2008 | Hayes et al. | |
| 2008/0315474 A1* | 12/2008 | Koeske | B60G 11/62 267/220 |
| 2012/0200020 A1* | 8/2012 | Peeters | B60G 11/27 267/122 |

FOREIGN PATENT DOCUMENTS

| | | |
|---|---|---|
| DE | 200 23 582 | 12/2004 |
| EP | 1 300 264 | 4/2003 |
| WO | WO 2008-124301 | 10/2008 |
| WO | WO 2009-148813 | 12/2009 |

OTHER PUBLICATIONS

European Search Report from corresponding patent application No. 10850853.2 dated Mar. 19, 2014.

* cited by examiner

GAS SPRING ASSEMBLY AND METHOD OF ASSEMBLING SAME

This application is a continuation of U.S. Patent Application Ser. No. 13/643,829, filed on Oct. 26, 2012, which was the National Stage of International Application No. PCT/US2010/032349, filed on Apr. 26, 2010, the subject matter of both of which are hereby incorporated herein by reference in their entireties.

BACKGROUND

The subject matter of the present disclosure broadly relates to the art of gas spring devices and, more particularly, to a gas spring assembly that includes a jounce bumper assembly capable of rotation about an axis while maintaining an approximately fixed axial position during such rotation as well as a method of assembling such a gas spring assembly.

The subject matter of the present disclosure finds particular application and use in conjunction with suspension systems of wheeled vehicles, and will be shown and described herein with reference thereto. However, it is to be appreciated that the subject matter of the present disclosure is also amenable to other applications and environments, and that the specific uses shown and described herein are merely exemplary. For example, the subject matter of the present disclosure could be used in support structures, height adjusting systems and actuators associated with industrial machinery, components thereof and/or other such equipment. Accordingly, the subject matter of the present disclosure is not intended to be limited to use associated with vehicle suspensions.

Motor vehicles of most types and kinds include a sprung mass, such as a body or chassis, for example, with a suspension system disposed therebetween. Gas spring assemblies, which are also commonly referred to as air springs, are commonly known and widely used in vehicle suspension systems. Typical suspension systems include a plurality of spring devices as well as a plurality of damping devices that together permit both sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

A gas spring assembly generally includes a flexible sleeve or bellows that extends between a pair of end members. In the assembled condition, the end members are secured to the flexible sleeve or bellows in a substantially permanent manner such that a fluid-tight spring chamber is formed within the gas spring assembly. Generally, the range of motion of a gas spring assembly extends between a fully compressed condition and a fully extended condition. To eliminate contact between opposing portions of the sprung and unsprung masses, contact between opposing portions of components of the suspension system or contact between any combination thereof, a jounce bumper is commonly installed within the spring chamber on one of the end members of the gas spring assembly. The jounce bumper prevents opposing portions of the suspension system from directly impacting one another. Thus, during jounce motion, an opposing component will contact the jounce bumper rather than impacting the component on or near which the jounce bumper is mounted.

Jounce bumpers of a variety of types, kinds and configurations have been developed and are widely used to prevent direct contact between vehicle and/or suspension system components. However, one difficulty with known jounce bumper constructions relates to the connection arrangements that are commonly utilized to secure the jounce bumper within the spring chamber to one of the end members of the gas spring assembly. In particular, it has been observed that under certain conditions of use repeated contact of an end member with a jounce bumper of a known construction can result in the jounce bumper becoming detached or otherwise disconnected from the end member. As mentioned above, however, gas spring assemblies are generally considered to be permanently assembled. As such, the detached jounce bumper will normally remain free within the spring chamber until the gas spring assembly is replaced.

It is believed desirable to develop gas spring assemblies and methods of assembling the same that are capable of overcoming the foregoing and/or other problems and disadvantages.

SUMMARY OF THE INVENTION

One example of a gas spring assembly in accordance with the subject matter of the present disclosure can include a first end member, a piston assembly disposed in longitudinally-spaced relation to the first end member, a flexible sleeve, an end closure, a connector fitting, a jounce bumper assembly and a retaining member. The piston assembly can include a piston base, a piston body and a support post. The piston body can be supported on the piston base and can include a longitudinally-extending axis, a first end, a second end spaced longitudinally from the first end, a side wall extending between the first and second ends, and an end wall extending transverse to the side wall along the first end. The end wall can include a first opening formed therethrough. The side wall can at least partially define a second opening along the second end of the body that is adapted to receive at least a portion of the piston base. The support post can extend longitudinally between opposing first and second ends of the piston body. The first end can be received within the first opening of the end wall of the piston body and the second end can be operatively connected to the base. The flexible sleeve can extend between opposing first and second ends. The first end of the flexible sleeve can be operatively connected to the first end member such that a substantially fluid-tight seal is formed therebetween. The second end of the flexible sleeve can be disposed along the piston assembly such that a rolling-lobe is formed along the side wall of the piston body and a spring chamber is at least partially defined between the first end member and the piston assembly. The end closure can be received along the second end of the flexible wall and can be secured to the piston assembly such that at least a portion of the flexible wall is captured between the end closure and the end wall of the piston assembly. The end closure can include a first wall portion with a third opening extending therethrough. The end closure can be positioned along the piston assembly such that the third opening is disposed in approximate alignment with the first opening of the end wall of the piston body. The connector fitting can extend longitudinally between the end closure and the support post, and can include a first end disposed in abutting engagement with the end closure and an opposing second end operatively connected to the support post. The connector fitting can include a passage wall that extends longitudinally into the connector fitting from along the first end to at least partially define a fitting passage having a passage axis. The passage wall can include a first annular groove extending radially-outwardly into the connector fitting. The jounce bumper assembly can be supported on one of the end closure and the connector fitting and can include a bumper mount and a bumper body. The bumper mount can include a support plate and a securement pin that extends longitudinally from the support plate. The securement pin can include a second annular groove that is disposed therealong and extends radially-inwardly into the securement pin. The securement pin can be dimensioned for receipt into the fitting passage such that the first and second annular grooves can be at least approximately aligned with one another. The bumper body can be secured to the support plate. The retaining member can be at least partially received within the first and second annular grooves to retain the jounce bumper assembly on the one of the end closure and the connector fitting such that the jounce bumper assembly can freely rotate about the passage axis while substantially restricting axial displacement of the jounce bumper assembly relative to the piston assembly during the rotation.

Another example of a gas spring assembly in accordance with the subject matter of the present disclosure can include a first end member, a piston assembly, a flexible sleeve, an end closure, and a connector fitting. The piston assembly can be disposed in longitudinally-spaced relation to the first end member and can include a piston base, a piston body and a support post. The piston body can be supported on the piston base and can include a side wall and an end wall that extends transverse to the side wall. The end wall can include a first substantially-planar wall portion and a second substantially-planar wall portion that is disposed radially-outwardly from the first wall portion. The first wall portion can be disposed in a first plane and can include an opening extending therethrough. The second wall portion can be disposed in a second plane that is oriented in approximate alignment with the first plane and is spaced longitudinally from the first plane in a direction away from the piston base. The side wall can at least partially define an open end of the piston body opposite the end wall that is adapted to receive at least a portion of the base. The support post can be operatively connected between the piston base and the end wall of the piston body. The flexible sleeve can extend between opposing first and second ends with the first end operatively connected to the first end member such that a substantially fluid-tight seal is formed therebetween and the second end disposed along the end wall of the piston body such that a rolling-lobe is formed along the side wall of the piston body and a spring chamber is at least partially defined between the first end member and the piston assembly. The end closure can abuttingly engage the second end of the flexible wall and can be secured to the piston assembly such that at least a portion of the flexible wall is captured between the end closure and the end wall of the piston body. The end closure can include a first substantially-planar wall portion and a second substantially-planar wall portion that is spaced radially-outwardly from the first wall portion. The first wall portion can be disposed in a first plane and the second wall portion can be disposed in a second plane that is oriented in approximate alignment with the first plane and that is spaced longitudinally from the first plane in a direction toward the end wall of the piston body. The end closure can be supported on the piston body of the piston assembly such that the second wall portion of the end closure is in abutting engagement with the second wall portion of the end wall thereby at least partially defining a connector chamber between the first wall portion of the end closure and the first wall portion of the end wall. The connector fitting can be at least partially disposed within the connector chamber and can be operatively connected between the end closure and the support post.

A gas spring assembly according to the foregoing paragraph can be provided wherein the first wall portion of the end closure includes an opening formed therethrough. The connector fitting can include a first end disposed in abutting engagement with the first wall portion of the end closure, an opposing second end operatively connected to the support post and a passage wall extending longitudinally into the connector fitting from along the first end that at least partially defines a fitting passage in fluid communication with the spring chamber through the opening in the first wall portion of the end closure.

A gas spring assembly according to the foregoing paragraph can be provided wherein the connector fitting is attached to the end closure such that a substantially fluid-tight seal is formed therebetween.

A gas spring assembly according to the foregoing paragraph can be provided wherein the substantially fluid-tight seal is formed by a flowed-material joint operatively connecting said connector fitting and said end closure to one another.

A gas spring assembly according to any one of the foregoing three paragraphs can be provided that further includes a jounce bumper assembly supported on one of the end closure and the connector fitting.

A gas spring assembly according to the foregoing paragraph can be provided wherein the bumper assembly includes a bumper mount and a bumper body that is operatively connected to the bumper mount. The bumper mount can include a support plate and a securement pin that extends from the support plate and that is dimensioned for receipt into the fitting passage of the connector fitting.

A gas spring assembly according to the foregoing paragraph can be provided wherein the bumper body includes a material selected from the group consisting of rigid thermoplastic, thermoplastic elastomer, natural rubber and synthetic rubber.

A gas spring assembly according to either of the foregoing two paragraphs can be provided wherein the passage wall of the connector fitting includes a first annular groove that extends radially-outwardly into the connector fitting. And, the securement pin can include a second annular groove that extends radially-inwardly into the securement pin and is positioned longitudinally therealong such that the first and second annular grooves can be at least approximately aligned with one another.

A gas spring assembly according to the foregoing paragraph can be provided that further includes a retaining member at least partially received within the first and second annular grooves and that is operative to retain the jounce bumper assembly on the one of the end closure and the connector fitting such that the jounce bumper assembly can freely rotate while substantially restricting axial displacement of the jounce bumper assembly relative to the connector fitting during the rotation.

One example of a method of assembling a gas spring assembly in accordance with the subject matter of the present disclosure can include providing a piston assembly including a piston base, a piston body and a support post. The piston body can include a first end, a second end spaced longitudinally from the first end, a side wall extending between the first and second ends and an end wall extending transverse to the side wall along the first end. The side wall at least partially defining a first opening along the second end that is dimensioned to receive the piston base. The end wall includes a second opening extending therethrough. The support post extends longitudinally between first and second ends. The method can also include providing a flexible wall that includes a first end and a second end disposed generally opposite the first end. The method can further include providing an end closure that includes a first wall portion with an opening extending therethrough and a second wall portion disposed radially-outwardly from the first wall portion. The method can also include inserting the end closure within the first end of the flexible wall such that the second wall portion is in abutting engagement therewith. The method can further include providing a connector fitting that includes a fitting body extending longitudinally between opposing first and second ends, and operatively connecting the connector fitting with the end closure. The method can also include positioning the end closure along the end wall of the piston body such that at least a portion of the flexible wall adjacent the first end is captured between the second wall portion of the end closure and the end wall of the piston body. The method can further include inserting the first end of the support post through the second opening in the end wall of the piston body and operatively connecting the first end of the support post to the second end of the connector fitting to thereby secure the first end of the flexible wall between the second wall portion of the end closure and the end wall of the piston body. The method can also include positioning the piston base along the second end of the piston body and securing the piston base to the second end of the support post. The method can further include providing a jounce bumper assembly that includes a bumper mount and a bumper body. The bumper mount can include a support plate abuttingly engaging the bumper body and securement pin extending approximately longitudinally from the support plate in a direction opposite the bumper body. The method can also include attaching the jounce bumper assembly to the connector fitting such that the jounce bumper assembly can freely rotate relative to the connector fitting while substantially restricting longitudinal displacement of the jounce bumper assembly relative to the connector fitting during the rotation. The method can further include providing an end member, and operatively connecting the end member across the second end of the flexible wall to form a substantially fluid-tight seal therewith and thereby at least partially define a spring chamber between the end member and the piston assembly.

DETAILED DESCRIPTION

Figure 1:
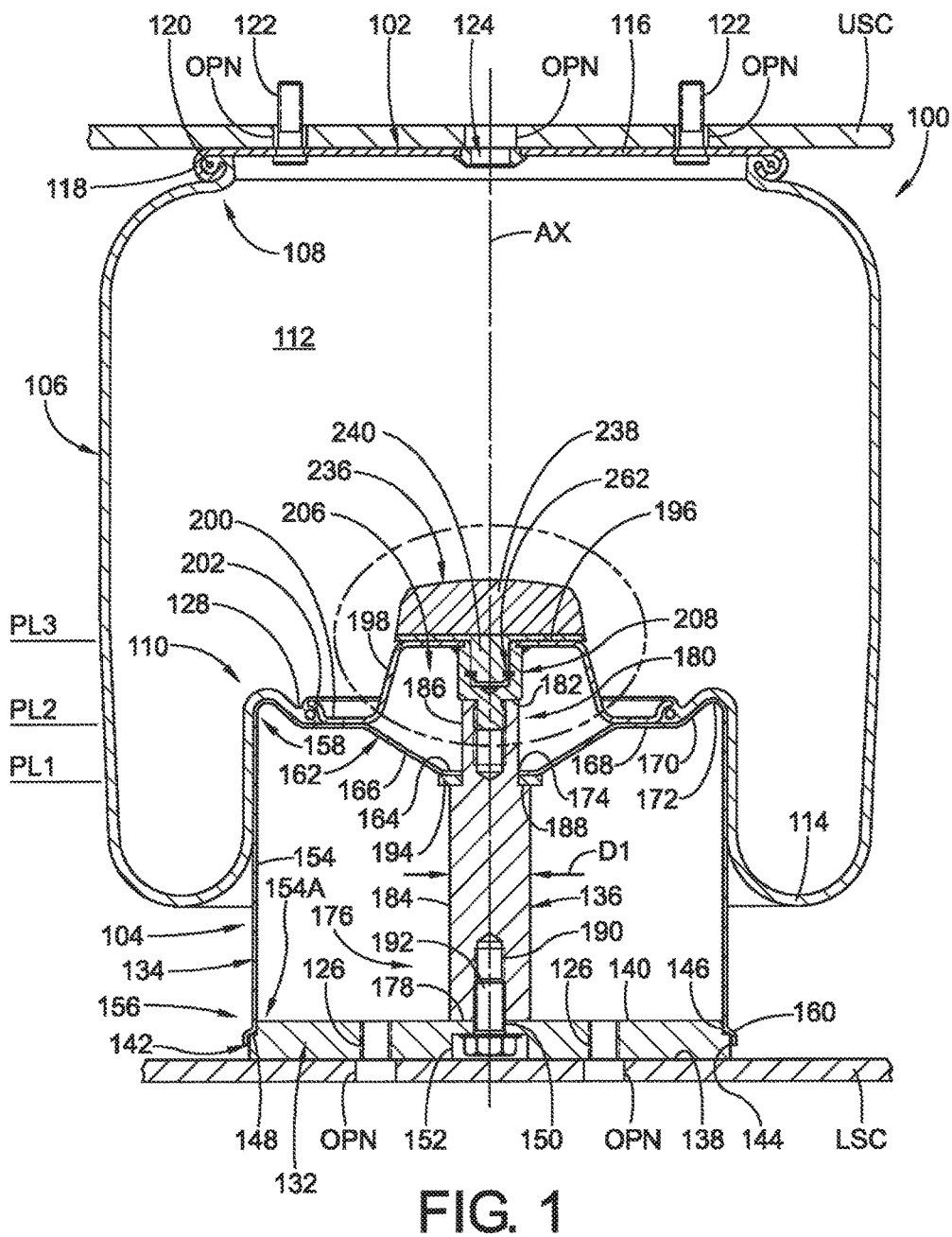
FIG. 1 is a cross-sectional side view of one example of a gas spring assembly in accordance with the subject matter of the present disclosure.

Turning now to the drawings wherein the showings are provided for the purpose of illustrating examples of the subject matter of the present disclosure and which are not to be interpreted as limiting the same, FIG. 1 illustrates one example of a gas spring assembly 100, which is shown supported between an upper structural component USC and an opposing lower structural component LSC. It will be appreciated that upper and lower structural components are merely representative of structural components of any suitable type, kind and/or configuration, such as an associated body and an associated wheel-engaging member of an associated vehicle, for example.

Gas spring assembly 100 includes a central axis AX, a first or upper end member, such as a bead plate 102, for example, and a second or lower end member, such as a piston assembly 104, for example, that is spaced longitudinally from the first end member. A flexible wall 106 is shown extending between the end members and includes opposing, longitudinally-spaced ends 108 and 110. The flexible wall extends circumferentially about axis AX and is secured to the first and second end members in a substantially fluid-tight manner, such that a spring chamber 112 is at least partially defined therebetween. In the exemplary arrangement shown in FIG. 1, flexible wall 106 is illustrated as being of an elongated sleeve-type configuration that is capable of forming a rolling lobe 114 along the exterior of an end member, such as piston assembly 104, for example. However, it will be appreciated that other constructions and/or configurations could alternately be used, such as a convoluted bellows-type flexible wall that is secured between opposing bead plates or other end members, for example.

Flexible wall 106 can be secured between the end members in any suitable manner. For example, bead plate 102 can include an inner wall portion 116 and an outer peripheral wall portion 118. End 108 can include a mounting bead 120 formed therealong in a conventional manner, and outer peripheral wall portion 118 can be crimped around mounting bead 120 to form a substantially fluid-tight seal between the end member and the flexible wall.

Additionally, the end members can be secured to an associated structural component (e.g., upper or lower structural component USC or LSC, respectively) in any suitable manner. For example, upper structural component USC is shown as including one or more passages or openings OPN extending therethrough. Additionally, bead plate 102 is shown as including threaded mounting studs 122 projecting axially-outwardly therefrom and extending through one of openings OPN. In such an arrangement, a securement device, such as a threaded nut (not shown), for example, can be operatively connected to each mounting stud to secure bead plate 102 to upper structural component USC. Furthermore, pressurized gas can be transferred into and out of spring chamber 112 in any suitable manner. As one example, a passage 124 can optionally extend through bead plate 102 in fluid communication with one of openings OPN such that a suitable connection can be made with a fitting or gas transfer line (not shown).

As another example, lower structural component LSC can include one or more passages or openings OPN. Piston assembly 104 can include one or more securement features, such as threaded passages 126, for example, that are cooperative with openings OPN in the lower structural component, such as for receiving threaded fasteners (not shown), for example, to secure the second end member to the lower structural component.

End 110 of flexible wall 106 can be operatively connected on or along the second end member (e.g., piston assembly 104) in any suitable manner. In the arrangement shown in FIG. 1, for example, end 110 includes a mounting bead 128 formed therealong that is at least partially disposed between piston assembly 104 and an end closure 130 that is secured to piston assembly 104. A substantially fluid-tight seal is formed between mounting bead 128 of end 110 and at least one of end closure 130 and piston assembly 104. As one example, mounting bead 128 can be cured to or otherwise adhesively connected to end closure 130 such that a substantially fluid-tight seal is formed therebetween. It will be appreciated, however, that any other suitable arrangement and/or configuration could alternately be used.

In the exemplary arrangement shown in FIG. 1, piston assembly 104 includes a piston base 132 that can abuttingly engage an associated structural component, such as lower structural component LSC, for example. Piston assembly 104 is also shown as including a piston body 134, which is supported on the piston base and can optionally be disposed in spaced relation to the associated structural component, and a support post 136, which is disposed between the piston base and the piston body.

Piston base 132 can include a surface 138 disposed toward an associated structural components, such as lower structural component LSC, for example, and a surface 140 that is space from surface 138 in a direction opposite the associated structural component such that a side wall 142 is at least partially disposed between surfaces 138 and 140. Side wall 142 can include a side wall portion 144 that extends toward surface 140 from along surface 138 and has a corresponding cross-sectional dimension (not identified). Side wall 142 can also include a side wall portion 146 that extends toward surface 138 from along surface 140 and has a corresponding cross-sectional dimension (not identified). In the exemplary arrangement shown, the cross-sectional dimension of side wall portion 146 is less than the cross-sectional dimension of side wall portion 144 such that a shoulder wall portion 148 is formed between first and second side wall portions 144 and 146.

In the exemplary arrangement shown in FIG. 1, threaded passages 126 extend through piston base 132 and are accessible from along at least surface 138. Piston base 132 can also optionally include an opening or passage 150 that extends therethrough for use in securing one or more other components, such as support post 136, for example, on or to the piston base. Additionally, a counterbore or recess 152 can optionally be provided along surface 138 that extends into the piston base in communication with passage 150.

Piston body 134 is shown as including a side wall 154 that extends longitudinally between opposing ends 156 and 158 of the piston body. Side wall 154 forms an opening 154A along end 156 that at least partially receives piston base 132. Side wall 154 can optionally include an outwardly-flared end portion 160 that at least partially engages shoulder wall portion 148 of piston base 132. In this manner, piston base 132 can provide radial support to end 156 of the piston body and/or can assist in aligning the piston body with the piston base. In the exemplary arrangement in FIG. 1, side wall 154 is shown as being approximately cylindrical in shape. It will be appreciated, however, that any other shape or configuration could alternately be used, and that the configuration shown is merely exemplary and is not intended to be limiting.

Piston body 134 also includes an end wall 162 that is disposed generally transverse to side wall 154. End wall 162 includes end wall portions 164, 166, 168 and 170. End wall portions 164 and 168 are shown in the exemplary embodiment in FIG. 1 as being approximately planar and extending generally transverse to side wall 154 and/or axis AX. Additionally, end wall portion 164 is shown as being disposed in a plane PL1. End wall portion 168 is shown as being disposed in a plane PL2 that is approximately aligned with plane PL1 but is longitudinally spaced therefrom in a direction toward the first end member (e.g., bead plate 102). Additionally, end wall portion 168 is disposed radially-outwardly from end wall portion 164.

End wall portion 166 is disposed between end wall portions 164 and 168, and generally connects end wall portions 164 and 168 with one another. End wall portion 166 is shown in FIG. 1 as being of an approximately frustoconical shape. However, it will be appreciated that any other suitable shape and/or configuration could alternately be used, such as a non-planar shape (e.g., curvilinear) or a combination of any number of planar and non-planar shapes (e.g., cylindrical), for example. End wall portion 170 is disposed radially-outwardly of end wall portion 168 and is also shown as having an approximately frustoconical shape. As discussed above, however, it will be appreciated that any other suitable shape and/or configuration could alternately be used. End wall portion 170 transitions to side wall 154 at a shoulder 172. Additionally, an opening 174 extends through end wall 162. In the arrangement shown in FIG. 1, opening 174 formed approximately centrally on end wall 162 and extends through end wall portion 166. It will be appreciated, however, that other arrangements and/or configurations could alternately be used.

Figure 2:
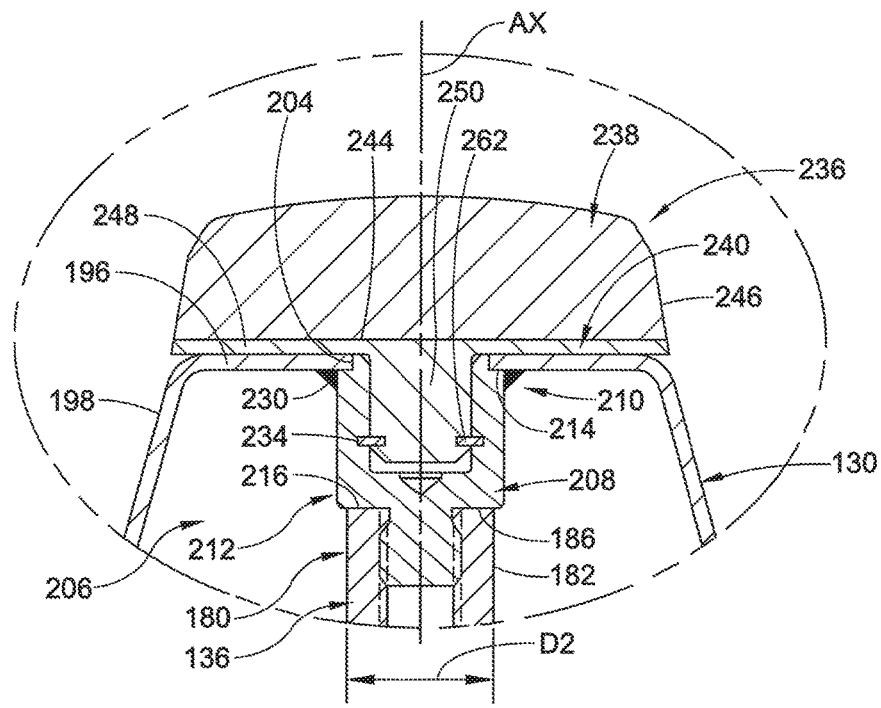
FIG. 2 is an enlarged cross-sectional side view of the portion of the exemplary gas spring assembly identified by Detail 2 in FIG. 1.

Support post 136 is disposed between end wall 162 of piston body 134 and piston base 132. Support post 136 extends longitudinally between an end 176 that includes an end wall 178 and an opposing end 180 that includes an end wall 182. Additionally, support post 136 includes a side wall portion 184 that is disposed toward end 176 and has a cross-sectional dimension, which is represented in FIG. 1 by reference dimension D1. Support post 136 also includes a side wall portion 186 that is disposed toward end 180 and has a cross-sectional dimension, which is represented in FIG. 2 by reference dimension D—2. Cross-sectional dimension D2 is shown as being less than cross-sectional dimension D1 such that shoulder wall 188 is formed between side wall portions 184 and 186.

Support post 136 is shown as being oriented such that end wall 178 is in abutting engagement with surface 140 of piston base 132. It will be appreciated that support post 136 can be secured to the piston base in any suitable manner. One example of a suitable arrangement is shown in FIG. 1 in which support post 136 includes a threaded passage 190 that extends longitudinally into the support post from along end wall 178. Threaded passage 190 can be approximately aligned with passage 150 in piston base 132 such that a securement device, such as a threaded fastener 192, for example, can extend through passage 150 and threadably interengage threaded passage 190. A head (not numbered) of threaded fastener 192 can be received in recess 152, which, for example, could be useful in permitting surface 138 to abuttingly engage the associated structural component without interference from threaded fastener 192. It will be appreciated, however, that any other suitable arrangement, configuration or combination of securement features and/or components could alternately be used.

Support post 136 is also shown as being positioned such that shoulder wall 188 is disposed adjacent end wall 162 of piston body 134. It will be appreciated that support post 136 can operatively interengage end wall 162 in any manner, arrangement and/or configuration suitable for support post 136 to provide support to end wall 162. For example, a portion of the support post, such as the shoulder wall, for example, could abuttingly engage a portion of the end wall. As another example, one or more intermediate components can be disposed between the support post and the end wall of the piston body. In the exemplary arrangement shown in FIG. 1, one intermediate component, such as a washer 194, for example, is disposed between a feature of the support post and a portion of the end wall. Washer 194 is shown as having opposing surfaces (not numbered) and an inner opening (not numbered). The inner opening of washer 194 is received along side wall portion 186 of support post 136 such that one of the opposing surfaces is disposed in abutting engagement with a feature of the support post, such as shoulder wall 188, for example. The opposing surface of washer 194 abuttingly engages end wall portion 164 of end wall 162. It will be appreciated, however, that the arrangement shown and described is merely exemplary and that any other suitable arrangement and/or configuration could alternately be used.

End closure 130 is disposed within spring chamber 112 and abuttingly engages at least a portion of end 110 of flexible wall 106. In some cases, end closure 130 may be provided separately from flexible wall 106 and secured to piston assembly 104 in a manner suitable for forming a substantially fluid-tight seal with flexible wall 106 and piston body 134 of the piston assembly. In other cases, end closure 130 may be adhered, vulcanized, cured or otherwise attached to the flexible wall, such as on or along mounting bead 128 thereof, for example, such that a substantially fluid-tight seal is formed between the end closure 130 and flexible wall 106.

In the exemplary embodiment shown in FIGS. 1-4, end closure 130 includes wall portions 196, 198, 200 and 202. Wall portions 196 and 200 are shown in the exemplary embodiment as being approximately planar and extending generally transverse to axis AX. Wall portion 196 is shown as including an opening or passage 204 (FIGS. 2-4) formed therethrough. Additionally, wall portion 196 is shown as being disposed in a plane PL3 while wall portion 200 is shown as being disposed in plane PL2. Plane PL3 is approximately aligned with plane PL2 but is longitudinally spaced therefrom in a direction toward the first end member (e.g., bead plate 102), such as has been described above with regard to planes PL1 and PL2. Wall portion 200 is also shown as being disposed radially-outwardly from wall portion 196.

Wall portion 198 is disposed between wall portions 196 and 200, and generally connects wall portions 196 and 200 with one another. Wall portion 198 is shown in FIG. 1 as being of an approximately frustoconical shape. However, it will be appreciated that any other suitable shape and/or configuration could alternately be used, such as a non-planar shape (e.g., curvilinear) or a combination of any number of planar and non-planar shapes (e.g., cylindrical), for example. Wall portion 202 is disposed radially-outwardly of wall portion 200 and is shown as having a curvilinear cross-sectional shape or profile. As discussed above, however, it will be appreciated that any other suitable shape and/or configuration could alternately be used. Additionally, in the exemplary embodiment shown in FIG. 1, wall portion 202 is attached to mounting bead 128 of flexible wall 106 such that a substantially fluid-tight seal is formed therebetween. As discussed above, however, it will be appreciated that other arrangements and/or connections can alternately be used.

End closure 130 is positioned on piston assembly such that wall portion 200 of the end closure is disposed along end wall portion 168 of end wall 162. In the exemplary arrangement shown, wall portion 200 and end wall portion 168 are in abutting engagement with one another. Additionally, at least a portion of end 110 of flexible wall 106 is captured between end closure 130 and end wall 162. In the exemplary arrangement shown, mounting bead 128 is at least partially captured between wall portion 202 of end closure 130 and wall portions 168 and/or 170 of end wall 162. It will be appreciated, however, that other arrangements could alternately be used.

In an exemplary embodiment, a connector chamber 206 can be defined between one or more portions of end closure 130 and one or more portions of end wall 162. In the exemplary arrangement shown in FIGS. 1-4, connector chamber 206 is generally defined by wall portions 196 and 198 of end closure 130 and end wall portions 164 and 166 of end wall 162. It will be appreciated, however, that any other suitable arrangement and/or configuration of walls and/or wall portions could alternately be used.

End closure 130 and piston assembly 104 are secured together and can be operatively connected to one another in any suitable manner. One example of a suitable arrangement is shown in FIGS. 1-4 in which a connector fitting 208 is secured to end closure 130 and support post 136 of piston assembly 104. It will be appreciated that the connector fitting can be secured to the end closure and the support post in any manner suitable for forming a structural connection between the components.

Connector fitting 208 extends longitudinally between opposing ends 210 and 212. Connector fitting 208 includes end walls 214 and 216 that are disposed along ends 210 and 212, respectively. Connector fitting 208 also includes a passage wall 218 (FIG. 4) that at least partially defines a fitting passage 220 (FIG. 4) that extends into connector fitting 208 from along end wall 214. A fitting boss 222 (FIG. 4) projects outwardly from end wall 216 and includes a plurality of threads 224 (FIG. 4) disposed along the fitting boss. In a preferred arrangement, support post 136 will include an opening or bore 226 (FIG. 4) formed thereinto from along end wall 182, and bore 226 will include a plurality of threads 228 (FIG. 4) that are cooperative with threads 224 of fitting boss 222. In such case, connector fitting 208 can be secured to support post 136, such as by threadably interengaging fitting boss 222 and bore 226 until end walls 182 and 216 abuttingly engage one another.

Connector fitting 208 can be secured to end closure 130 in any suitable manner. In the exemplary arrangement shown in FIGS. 1-4, connector fitting 208 is secured to wall portion 196 of end closure 130 using a flowed-material joint 230. It will be appreciated, however, that other arrangements and/or connections could alternately be used. In some cases, it may be desirable for connector fitting 208 and/or one or more features thereof (e.g., fitting passage 218) to be at least approximately aligned with one or more features and/or elements of end closure 130 and/or gas spring assembly 100. As one example, connector fitting can be positioned approximately centrally along wall portion 196 such that upon assembly two or more of the support post, the connector fitting and the end closure can be at least approximately aligned with axis AX of gas spring assembly 100. In such case, connector fitting 208 can optionally include a pilot boss 232 (FIG. 4) projecting outwardly from end wall 214. Pilot boss 232 can be dimensioned to be cooperatively received within opening 204 of end closure 130 and thereby at least approximately align the connector fitting and the end closure with one another.

Fitting passage 218 can include a passage axis (not identified) that is at least approximately aligned with axis AX. In some cases, the passage axis may be substantially coaxial with axis AX. In other cases, the passage axis may be laterally spaced from axis AX but extend in approximate alignment (including, but not limited to, being substantially parallel) with axis AX. Connector fitting 208 also includes an annular groove 234 that is positioned longitudinally along passage wall 218. Annular groove 234 extends longitudinally along passage wall 218 and extends radially-outwardly into the connector fitting.

Gas spring assembly 100 can optionally include a jounce bumper assembly 236 that is disposed within spring chamber 112 and is supported on or along any combination of one or more of piston assembly 104, end closure 130 and/or connector fitting 208. Jounce bumper assembly 236 includes a bumper body 238 and a bumper mount 240. Bumper body 238 can be formed from any suitable material or combination of materials and can be of any suitable size, shape, configuration and/or construction, such as may be preferred for use in a particular application. For example, bumper body 238 can be formed from a rigid thermoplastic material, a thermoplastic elastomer, a natural rubber compound, a synthetic rubber compound, or any combination of these and/or other polymeric materials.

Figure 3:
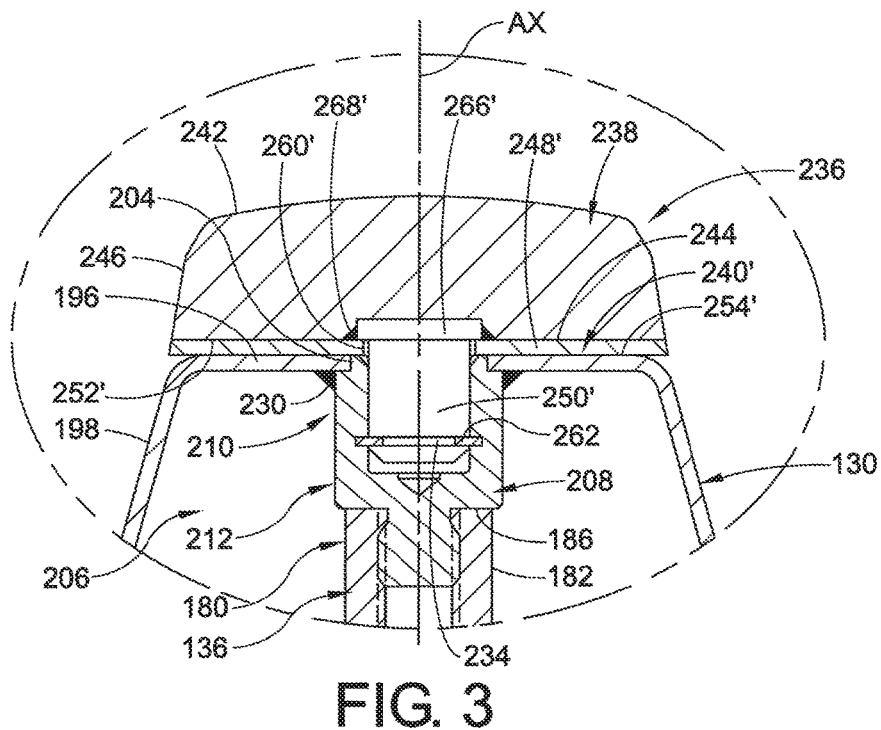
FIG. 3 is an enlarged cross-sectional side view of an alternate example of the portion of the gas spring assembly identified by Detail 2 in FIG. 1.
Figure 4:
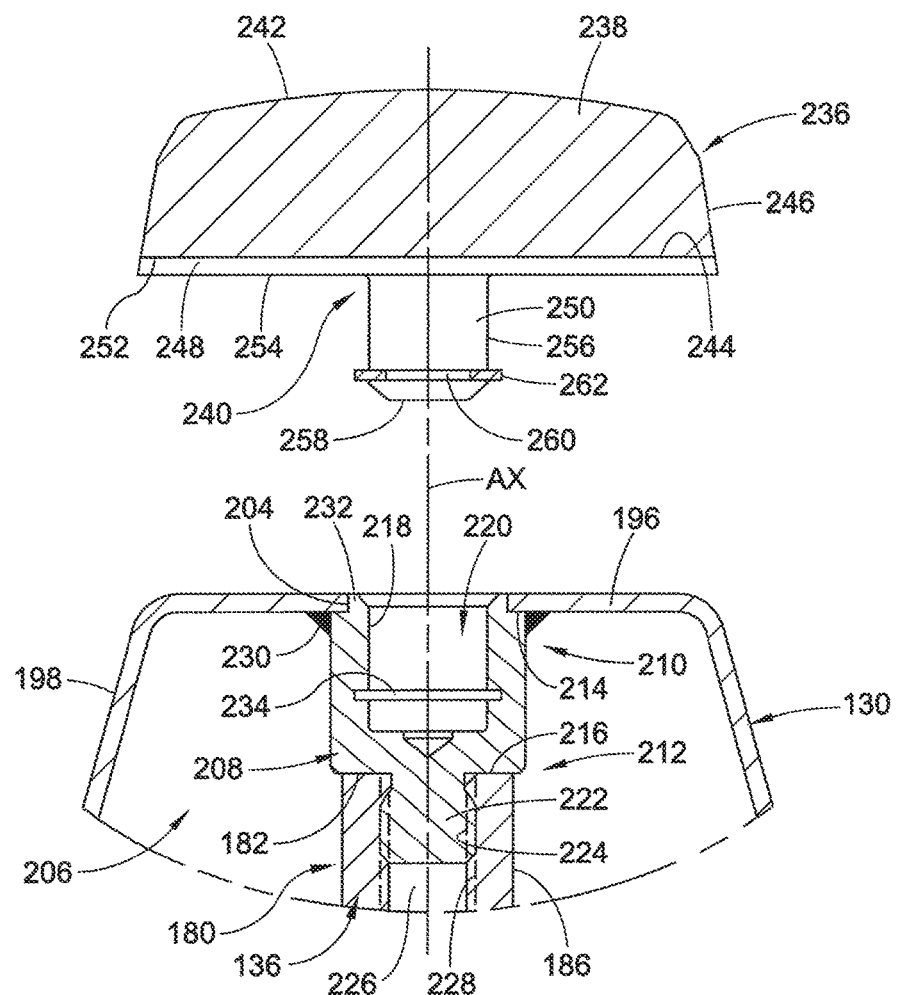
FIG. 4 is an exploded view of the portion of the exemplary gas spring assembly shown in FIGS. 2 and 3.

As shown in FIG. 2-4, bumper body 238 is shown as including surfaces 242 and 244 that are longitudinally spaced from one another. Optionally, a side surface 246 can extend between surfaces 242 and 244, and can define an outer periphery of bumper body 238. In the exemplary embodiment shown, surface 242 is curved, surface 244 is approximately planar and side surface 246 is tapered or frustoconical in shape. It will be appreciated, however, that the shape and configuration of bumper body 238 is merely exemplary and that surfaces of any suitable number, size and/or shape can alternately be used.

One example of a bumper mount construction is shown in FIG. 2 in which bumper mount 240 includes a support plate 248 that is adapted to receive bumper body 238 and a securement pin 250 that is adapted to secure the bumper mount on or along any one or more of piston assembly 104, end closure 130 and/or connector fitting 208. Support plate is shown as being approximately planar and includes opposing sides 252 and 254 (FIG. 4). Bumper body 238 is disposed along side 252 and can be secured thereto in any suitable manner, such as, for example, by using mechanical fasteners or interengaging features, an adhesive substance, molding or overmolding processes, or by vulcanizing or otherwise curing material onto side 252.

Securement pin 250 projects axially outwardly from along side 254 in a direction generally opposite bumper body 238. Securement pin 250 includes a pin side wall 256 (FIG. 4) that extends axially toward a pin end wall 258 (FIG. 4). Additionally, an annular groove 260 (FIG. 4) is positioned longitudinally along pin side wall 256. Annular groove 260 extends longitudinally along pin side wall 256 and extends radially-inwardly into the securement pin. The annular groove is preferably positioned along pin side wall 256 such that upon positioning the jounce bumper assembly in a predetermined position on or along at least one of the piston assembly, the end closure and/or the connector fitting, annular groove 260 can be at least approximately aligned with annular groove 234 in fitting passage 220 of connector fitting such that a retaining member 262 can be received within annular grooves 234 and 260 to secure jounce bumper assembly 236 on or along connector fitting 208.

In one preferred arrangement, annular grooves 234 and 260 can be at least approximately aligned with one another under conditions in which side 254 of support plate 248 is in abutting engagement with wall portion 196 of end closure 130. Wall portion 196 is at least partially supported by support post 136 together with connector fitting 208 as well as by wall portion 198. As such, forces imparted on jounce bumper assembly 236 can be transferred to lower structural component LSC through piston body 134 and piston base 132. In the preferred arrangement, such a transfer of forces will occur without reacting any substantial amount of shear force through retaining member 262. Rather, retaining member 262 can operate to prevent jounce bumper assembly 236 from being inadvertently removed or otherwise separated from the piston assembly, the end closure and/or the connector fitting while permitting the jounce bumper assembly to rotate relative to these same components.

One example of a suitable construction for retaining member 262 is shown in FIGS. 1-4 as an element having opposing sides, an inner edge forming a passage through the retaining member and an outer wall edge defining an outer periphery of the element. In some cases, the element can be endless. In other cases, however, a split element can be used to promote ease of assembly and/or for other purposes. In the arrangement shown in FIGS. 1-4, retaining member 262 is illustrated as a substantially planar or flat retaining ring. However, it will be appreciated that any suitable arrangement and/or configuration can alternately be used, such as a frustoconical spring element or a wavy washer, for example.

In the exemplary arrangement shown in FIG. 2, support plate 248 and securement pin 250 are integrally formed from a common mass of material, such as metal or rigid plastic, for example. As such, bumper mount 240 can be formed as a single, unitary component. Another example of a bumper mount construction is shown in FIG. 3 in which bumper mount 240' includes a support plate 248' that is adapted to receive bumper body 238 and a securement pin 250' that is adapted to secure the bumper mount on or along any one or more of piston assembly 104, end closure 130 and/or connector fitting 208. It will be appreciated that functional features and elements of bumper mount 240' are substantially similar to those of bumper mount 240 and, as such, are not repeated here.

In the exemplary arrangement shown in FIG. 3, support plate 248' includes opposing sides 252' and 254' as well as an opening 264' that extends through the support plate. Securement pin 250' includes a radially-outwardly extending head or flange 266' that has a cross-sectional dimension that is greater than the cross-sectional dimension of opening 264'. As such, securement pin 250' can be received through opening 264' such that flange 266' is disposed in abutting engagement with side 252' of support plate. In such construction, securement pin 250' can be secured to support plate 248' in a suitable manner, such as by using a flowed-material joint 268', for example.

Regardless of the bumper mount construction that is used, the jounce bumper assembly is secured on or along one or more of piston assembly 104, end closure 130 and/or connector fitting 208. In the exemplary arrangement shown in FIGS. 1-4, the securement pin of the jounce bumper assembly is received in fitting passage 220 of connector fitting 208 such that annular grooves 234 and 260 are at least approximately aligned with one another. In such case, retaining member 262 can be at least partially received within each of annular grooves 234 and 260 and thereby prevent inadvertent disassociation of the jounce bumper assembly from the connector fitting and/or other components. The annular (e.g., circumferentially endless) configuration of grooves 234 and 260 permit jounce bumper assembly 236 to rotate about the axis of fitting passage 220 while maintaining an approximately fixed axial position during such rotation. Additionally, the use of flowed-material joint 230 can form a substantially fluid-tight seal between end closure 130 and connector fitting 208. In a preferred arrangement, fitting passage 220 is formed as a blind or non-through hole such that a fluid-loss pathway is not provided through connector fitting 208.

One example of a method of assembling a gas spring assembly includes providing a piston assembly, such as piston assembly 104, for example, that includes a piston base, a piston body and a support post. The method also includes providing a flexible wall, such as flexible wall 106, for example, that extends between opposing ends. The method further includes providing an end closure, such as end closure 130, for example, and inserting the end closure within a first end of the flexible wall. The method further includes providing a connector fitting, such as connector fitting 208, for example, that includes a fitting body extending longitudinally between opposing first and second ends, and operatively connecting the connector fitting with the end closure.

The method further includes positioning the end closure and the connector fitting along an end wall of the piston body such that at least a portion of the flexible wall adjacent the first end thereof is captured between a wall portion of the end closure and the end wall of the piston body. The method also includes inserting a first end of the support post through an opening in the end wall of the piston body and operatively connecting the first end of the support post to the connector fitting to thereby secure the first end of the flexible wall between a wall portion of the end closure and the end wall of the piston body. The method further includes positioning the piston base along a second end of the piston body, and securing the piston base to a second end of the support post.

The method also includes providing a jounce bumper assembly, such as jounce bumper assembly 236, for example, that includes a bumper mount, such as bumper mount 240, for example, and a bumper body, such as bumper body 238, for example. The bumper mount can include a support plate that abuttingly engages the bumper body and a securement pin that extends approximately longitudinally from the support plate in a direction opposite the bumper body. The method further includes attaching the jounce bumper assembly to the connector fitting such that the jounce bumper assembly can freely rotate relative to the connector fitting while substantially restricting longitudinal displacement of the jounce bumper assembly relative to the connector fitting during the rotation. The method also includes providing an end member, such as bead plate 102, for example, and operatively connecting the end member across a second end of the flexible wall to form a substantially fluid-tight seal therewith and thereby at least partially define a spring chamber between the end member and the piston assembly.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention clamed is:

1. A gas spring assembly comprising;
a first end member;
a piston assembly disposed in longitudinally-spaced relation to said first end member, said piston assembly including:
   a piston base;
   a piston body supported on said piston base and including a longitudinally-extending axis, a first end, a second end spaced longitudinally from said first end, a side wall extending between said first and second ends and an end wall extending transverse to said side wall along said first end, said end wall including a first opening formed therethrough, and said side wall at least partially defining a second opening along said second end of said body that is adapted to receive at least a portion of said base; and, a support post extending longitudinally between opposing first and second ends of said piston body, said support post including a first end received within said first opening of said end wall of said piston body and a second end operatively connected to said piston base;

a flexible wall extending between opposing first and second ends, said first end of said flexible wall operatively connected to said first end member such that a substantially fluid-tight seal is formed therebetween, said second end of said flexible wall disposed along said piston assembly such that a rolling-lobe is formed along said side wall of said piston body and a spring chamber is at least partially defined between said first end member and said piston assembly;

an end closure received along said second end of said flexible wall and secured to said piston assembly such that at least a portion of said flexible wall is captured between said end closure and said end wall of said piston assembly, said end closure including a first wall portion with a third opening extending therethrough, said end closure positioned along said piston assembly such that said third opening is disposed in approximate alignment with said first opening of said end wall of said piston body;

a connector fitting extending longitudinally between said end closure and said support post, said connector fitting including a first end disposed in abutting engagement with said end closure and a second end opposite said first end and operatively connected to said support post, said connector fitting including a passage wall extending longitudinally into said connector fitting from along said first end thereof to at least partially define a fitting passage having a passage axis, said passage wall including a first annular groove extending radially outward into said connector fitting;

a jounce bumper supported on one of said end closure and said connector fitting, said jounce bumper including:
a bumper body with an end surface dimensioned to abuttingly engage said first end member;
a bumper mounting surface facing opposite said end surface of said bumper body; and,
a securement pin that extends longitudinally outward beyond said bumper mounting surface in a direction opposite said end surface of said bumper body, said securement pin including a second annular groove disposed therealong and extending radially inward into said securement pin, and said securement pin dimensioned for receipt into said fitting passage such that said first and second annular grooves can be at least approximately aligned with one another; and, a retaining member at least partially received within said first and second annular grooves to retain said jounce bumper on said one of said end closure and said connector fitting such that said jounce bumper is indefinitely rotatable about said passage axis while substantially restricting axial displacement of said jounce bumper to a substantially-fixed axial position relative to said piston assembly during said rotation.

2. A gas spring assembly according to claim 1, wherein a connector chamber is at least partially defined between at least a portion of said end closure and at least a portion of said end wall of said piston body.

3. A gas spring assembly according to claim 2, wherein at least a portion of at least one of said connector fitting and said support post is disposed within said connector chamber.

4. A gas spring assembly according to claim 2, wherein said end wall of said piston body has a first frustoconical wall portion that at least partially defines said connector chamber.

5. A gas spring assembly according to claim 4, wherein said end wall of said piston body has a second frustoconical wall portion disposed radially outward from said first frustoconical wall portion and radially outward beyond said connector chamber.

6. A gas spring assembly according to claim 4, wherein said end wall of said piston body includes a first planar wall portion extending radially inward from said first frustoconical wall portion and said first opening of said end wall extends through said first planar wall portion.

7. A gas spring assembly according to claim 6, wherein said support post includes a first side wall portion having a first cross-sectional dimension and a second side wall portion having a second cross-sectional dimension that is greater than said first cross-sectional dimension such that a shoulder wall is at least partially defined therebetween.

8. A gas spring assembly according to claim 7, wherein said first opening in said end wall of said piston body has an opening cross-sectional dimension that is complimentary to said first cross-sectional dimension of said first side wall portion of said support post such that said first side wall portion is at least partially received in said first opening and at least a portion of said end wall is disposed adjacent said shoulder wall.

9. A gas spring according to claim 1, wherein said retaining member includes one of an elastomeric sealing ring, a conical disc-spring and a split-ring washer.

10. A gas spring assembly according to claim 1, wherein said connector fitting sealingly engages said end closure such that a substantially fluid-tight seal is formed therebetween.

11. A method of assembling a gas spring assembly, said method comprising;
providing a piston assembly including a piston base, a piston body and a support post, said piston body including a first end, a second end spaced longitudinally from said first end, a side wall extending between said first and second ends of said piston body and an end wall extending transverse to said side wall along said first end of said piston body, said side wall at least partially defining a first opening along said second end of said piston body that is dimensioned to receive said piston base, said end wall including a second opening extending therethrough, said support post extending longitudinally between first and second ends thereof;
providing a flexible wall including a first end and a second end disposed generally opposite said first end of said flexible wall;
providing an end closure including a first wall portion with an opening extending therethrough and a second wall portion disposed radially-outwardly from said first wall portion, and inserting said end closure within said first end of said flexible wall such that said second wall portion is in abutting engagement with said first end of said flexible wall;
providing a connector fitting including a fitting body extending longitudinally between opposing first and second ends thereof, and operatively connecting said connector fitting with said end closure;

positioning said end closure along said end wall of said piston body such that at least a portion of said flexible wall adjacent said first end thereof is captured between said second wall portion of said end closure and said end wall of said piston body;

inserting said first end of said support post through said second opening in said end wall of said piston body and operatively connecting said first end of said support post to said second end of said connector fitting to thereby secure said first end of said flexible wall between said second wall portion of said end closure and said end wall of said piston body;

positioning said piston base along said second end of said piston body, and securing said piston base to said second end of said support post;

providing a jounce bumper including a bumper body with a first end surface, a bumper mounting surface facing away from said first end surface, and a securement pin extending approximately longitudinally outward beyond said bumper mounting surface in a direction opposite said bumper body;

attaching said jounce bumper to said connector fitting through non-rotating axial displacement of said jounce bumper and said connector fitting relative to one another and such that said jounce bumper is indefinitely rotatable relative to said connector fitting while substantially restricting longitudinal displacement of said jounce bumper to a substantially-fixed axial position relative to said connector fitting during said rotation; and, providing an end member, and operatively connecting said end member across said second end of said flexible wall to form a substantially fluid-tight seal therewith and thereby at least partially define a spring chamber between said end member and said piston assembly.

12. A method according to claim 11, wherein said action of operatively connecting said connector fitting to said end closure includes forming a substantially fluid-tight seal between said connector fitting and said end closure.

13. A method according to claim 11, wherein said action of providing a connector fitting includes providing a connector fitting including a passage wall extending into said fitting body that at least partially defines a fitting passage having an axis, and said action of attaching said jounce bumper to said connector fitting includes inserting said securement pin into said fitting passage of said connector fitting.

14. A method according to claim 13, wherein said action of providing a connector fitting includes providing a connector fitting that includes a first annular groove extending radially outward into said connector fitting along said passage wall, said action of providing a jounce bumper includes providing a second annular groove extending radially inward into said securement pin, and said method further comprising: providing a retaining member;
installing said retaining member into one of said first and second annular grooves; and,
installing said retaining member into the other of said first and second annular grooves by inserting at least said securement pin into said fitting passage of said connector fitting.

15. A piston and jounce bumper assembly dimensioned for securement to an associated flexible wall, said piston and jounce bumper assembly comprising:
a piston having a longitudinally-extending axis and including a first end, a second end spaced longitudinally from said first end, a side wall portion at least partially disposed between said first and second ends, an end wall portion extending transverse to said side wall portion along said first end, and a base wall portion extending transverse to said side wall portion toward said second end in spaced relation to said end wall portion, and said piston dimensioned to receivingly engage the associated flexible wall such that an associated rolling lobe of the associated flexible wall can be formed along said side wall portion of said piston;

a connector fitting accessible from along said first end of said piston, said connector fitting including first and second ends with said first end of said connector fitting oriented toward said end wall portion of said piston and said second end of said connector fitting oriented toward said base wall portion of said piston, said connector fitting including a passage surface extending longitudinally into said connector fitting from along said first end thereof to at least partially define a fitting passage having a passage axis, said passage surface including a first groove oriented transverse to said longitudinal axis and extending into said connector fitting;

a jounce bumper including:
a bumper body with an end surface dimensioned to abuttingly engage an associated gas spring end member;
a bumper mounting surface facing opposite said end surface of said bumper body; and,
a securement pin that projects longitudinally outward beyond said bumper mounting surface in a direction opposite said end surface of said bumper body, said securement pin including a second groove disposed therealong, said second groove being oriented transverse to said longitudinal axis and extending into said securement pin, said securement pin dimensioned for receipt into said fitting passage under non-rotating axial displacement of said jounce bumper such that said first and second grooves can be at least approximately aligned with one another; and, a retaining member operatively disposed between said jounce bumper and said connector fitting and at least partially received within said first and second grooves such that said jounce bumper is indefinitely rotatable about said passage axis while substantially restricting axial displacement of said jounce bumper to a substantially-fixed axial position relative to said piston assembly during said rotation.

16. An assembly according to claim 15, wherein at least one of said first and second grooves is an endless, annular groove.

17. An assembly according to claim 16, wherein each of said first and second grooves are endless, annular grooves.

18. An assembly according to claim 15, wherein said retaining member includes one of an elastomeric sealing ring, a conical disc-spring and a split-ring washer.

19. An assembly according to claim 15, wherein said end wall portion includes a first opening formed therethrough, and said assembly further comprises:
a support post including first and second ends with said first end of said support post oriented toward said first opening of said end wall portion of said piston and operatively secured to said connector fitting and with said second end of said support post operatively connected to said base wall portion of said piston.

20. An assembly according to claim 15 further comprising an end closure secured to said piston such that at least a portion of the associated flexible wall is captured between said end closure and said end wall portion of said piston, said end closure including a first wall portion with an opening extending therethrough, said first wall portion secured to said connector fitting such that said fitting passage is accessible through said opening in said first wall portion.

* * * * *